P. K. DEDERICK.
BALING PRESS.
No. 177,219. Patented May 9, 1876.
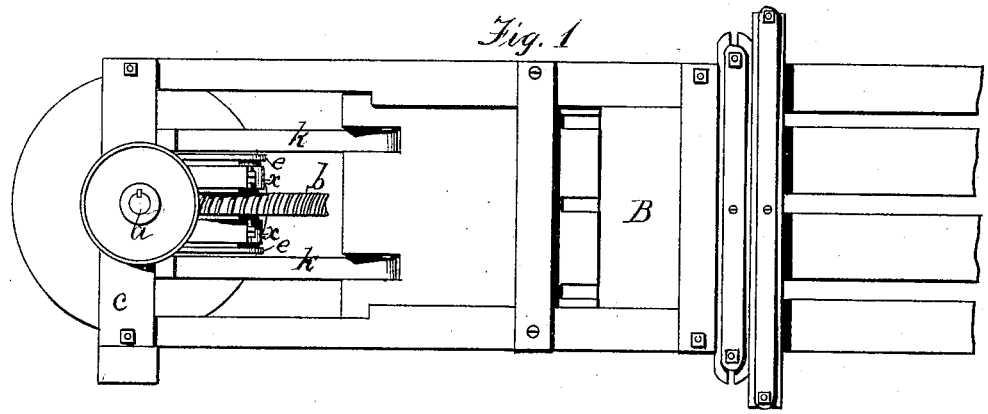
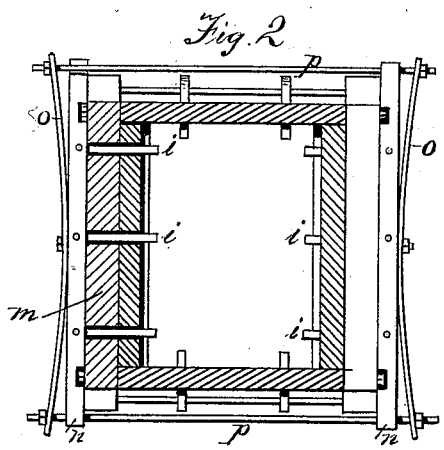
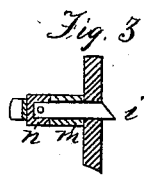
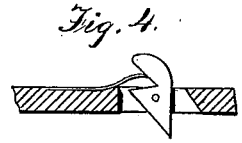
Witnesses
Grenville Lewis
A. Church
Inventor
Peter K. Dederick
By Hill, Ellsworth, Spear
His Attys.

UNITED STATES PATENT OFFICE.

PETER K. DEDERICK, OF ALBANY, NEW YORK.

IMPROVEMENT IN BALING-PRESSES.

Specification forming part of Letters Patent No. 177,219, dated May 9, 1876; application filed April 15, 1876.

*To all whom it may concern:*

Be it known that I, PETER K. DEDERICK, of Albany, in the county of Albany and State of New York, have invented certain new and useful Improvements in Baling-Presses; and I do hereby declare the following to be a full, clear, and exact description of the same, reference being had to the accompanying drawings, forming part of this specification, in which—

Figure 1 shows a side view of the press and power; Fig. 2, a transverse section through the retainers and bars in which they are fixed. Figs. 3 and 4 show detached views, in section, of retainers.

Similar letters of reference in the drawings denote the same parts.

My invention consists of an improvement in the power for operating the traverser of a continuous baling-press and an improved modification of the retainers.

The press, such as I have shown in Fig. 1, is of construction heretofore shown, with openings B in the sides for admitting the hay or other material to be pressed. The traverser, which is not here claimed, is made with slots and interposed elastic packing to allow the sides to yield laterally, if necessary. This traverser moves and operates as has been shown in patents granted to me prior to this date. To apply power to this traverser in a ready way, and by compact and simple apparatus, I place in the upright end pieces C a shaft, $a$, on one end of which is a driving-pulley and in the other a balance-wheel. This shaft is formed midway with a worm-screw, which works in the periphery of a wheel, $b$, and serves to turn it. This wheel is mounted in suitable bearings $x\,x$ above and below. On the ends of its shaft are fixed cranks $e\,e$, to the ends of which are pivoted the pitmen $k\,k$, which directly act on the traverser.

Power is applied to the driving-pulley on the shaft $a$, or may, if a horse-power be used, be directly applied to the shaft $a$. The rotation of the shaft serves to turn with great force the worm-wheel $b$, and to move the cranks, with rapidity in part of the motion and powerfully at the latter part of the pressure, in a manner well suited to the work to be done. The hay is introduced into the open sides B and pushed forward by the movement of the traverser, building up the bale in sections, and ejecting the finished bales in the ordinary manner of my presses.

The modifications of the retainers are shown in place in Fig. 2, and in the detached views of Figs. 3 and 4.

Through holes in the sides of the press are inserted short bars $i\,i$, passing, in this case, through the sides, and through an additional piece, $m$, upon the outside of the press. These retainers $i\,i$ are held at their outer ends in bars $n\,n$, to which are attached springs $o\,o$, connected by rods $p\,p$ with nuts on the ends, by which the tension of the springs may be regulated. The passage of the partition-follower over the beveled ends presses back the retainers and the bars, to which they are connected, and the reaction of the springs returns them and holds them in place.

Another simple and efficient form of retainer is shown in Fig. 4.

Having thus described my invention, what I claim as new is—

1. The combination of the worm-wheel $b$, with one or more cranks, $e$, pitmen $k\,k$, and traverser, substantially as and for the purposes set forth.

2. The worm and shaft $a$, provided with a balance-wheel, in combination with worm-wheel $b$ and crank, for the purpose described.

3. The retainers $i\,i$, fixed to the bars $n$, in combination with the springs and rods, and applied to the baling-press, as and for the purposes set forth.

PETER K. DEDERICK.

Witnesses:
R. VAN SCHOONHOVEN,
W. A. SKINKLE.